United States Patent
Smoot et al.

(10) Patent No.: US 10,228,758 B2
(45) Date of Patent: Mar. 12, 2019

(54) SYSTEM FOR PROVIDING MULTI-DIRECTIONAL AND MULTI-PERSON WALKING IN VIRTUAL REALITY ENVIRONMENTS

(71) Applicant: DISNEY ENTERPRISES, INC., Burbank, CA (US)

(72) Inventors: Lanny S. Smoot, Thousand Oaks, CA (US); Cynthia Rueyi Sung, Cambridge, MA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 146 days.

(21) Appl. No.: 15/159,921

(22) Filed: May 20, 2016

(65) Prior Publication Data

US 2017/0336860 A1  Nov. 23, 2017

(51) Int. Cl.
*G06F 3/01* (2006.01)

(52) U.S. Cl.
CPC .............. *G06F 3/011* (2013.01); *G06F 3/016* (2013.01); *G06F 2203/012* (2013.01)

(58) Field of Classification Search
CPC ..... G06F 3/011; G06F 3/016; G06F 2203/012
See application file for complete search history.

(56) References Cited

U.S. PATENT DOCUMENTS

| | | | |
|---|---|---|---|
| 9,317,141 B2 | 4/2016 | Smoot et al. | |
| 2003/0141165 A1 | 7/2003 | Reznik et al. | |
| 2006/0209019 A1 | 9/2006 | Hu | |
| 2009/0058855 A1 | 3/2009 | Mishra et al. | |
| 2010/0108408 A1 | 5/2010 | Colgate et al. | |
| 2012/0229405 A1 | 9/2012 | De Jong et al. | |

(Continued)

FOREIGN PATENT DOCUMENTS

DE  69621844 T2  1/2003

OTHER PUBLICATIONS

"SPIE proceeding 2001.pdf"; by Walter Littmann, Heiner Storck, Jörg Wallaschek. SPIE's 8th Annual International Symposium proceeding, published Jul. 2001.*

(Continued)

*Primary Examiner* — Amr A Awad
*Assistant Examiner* — Wing H Chow
(74) *Attorney, Agent, or Firm* — Marsh Fischmann & Breyfogle LLP; Kent A. Lembke

(57) ABSTRACT

A motion system for moving objects in a space, e.g., for moving virtual reality (VR) participants about space used to provide a VR environment. The system includes a controller and a position monitoring assembly. The system has a modular floor including a plurality of tile assemblies defining a support surface for a first and a second object. Each of the tile assemblies includes: (a) a planar tile with an upper surface for supporting the first and second objects; and (b) a drive system. The drive system includes a vibration-inducing assembly operable to oscillate the planar tile in a horizontal plane and further includes a preferential friction assembly operable to selectively reduce friction between the upper surface and any supported object. The controller generates control signals, based on position information, to independently control the tile assemblies of the modular floor to move the first and second objects on the support surface.

17 Claims, 11 Drawing Sheets

(56) References Cited

U.S. PATENT DOCUMENTS

2013/0001873 A1     1/2013   Stromberg
2014/0268515 A1     9/2014   Smoot et al.

OTHER PUBLICATIONS

Kurtus, "Causes of Friction," Succeed in Understanding Physics: School for Champions, Feb. 16, 2008.
Extended European Search Report for EP Application No. 17154859.7, dated Jul. 17, 2017.

\* cited by examiner

SYSTEM FOR PROVIDING MULTI-DIRECTIONAL AND MULTI-PERSON WALKING IN VIRTUAL REALITY ENVIRONMENTS

BACKGROUND

1. Field of the Description

The present description relates, in general, to providing mobility to people in a virtual reality (VR) environment, and, more particularly, to a system (and corresponding control method) configured to allow multiple participants in a VR environment to have the sensation of moving (e.g., walking) about the space in any direction and for unlimited distances without collisions with the other moving participants, with objects in the space, and/or with physical borders of the space.

2. Relevant Background

Virtual reality (VR), which is also known as augmented reality, immersive multimedia, and computer-simulated reality, is a computer technology that replicates a real or imagined environment and simulates a user's presence in the environment in a way that allows the user to interact with the environment. VR systems can create environments that artificially create a variety of sensory experiences such as sight, sound, and even touch (e.g., through haptic feedback devices) and smell in some cases. Most VR systems include a special VR headset with additional simulations to provide sensory information in addition to visual input such as sound and air movement.

VR environments can be quite detailed and immersive with present technologies and control techniques, but there remain a number of challenges for the designers of new VR systems. For example, designers of VR systems often aspire to provide a VR environment like science fiction models in which it is possible to have a hyper-real surrounding that seems infinite in span. To this end, it has long been desired to allow users or VR participants (e.g., people wearing VR headsets) to not have to be stationary (e.g., seated or standing in one space or one location). Instead, it is a goal to have the users walk around freely and in any direction, even over long distances, without running into the walls of the space used to provide or enclose the VR environment. Additionally, it is desirable for two or more users to be able to use the space at the same time, with each being able to follow their own path (e.g., move in any direction and different directions from the others in the VR space).

A number of approaches have been tried to allow a VR user to have the sensation of walking while in a VR environment, but none have been wholly successful in meeting the needs of VR system designers. Some VR systems have utilized a single omnidirectional treadmill, but this is limited to a single user as are similar devices such as a motorized spinning platform that can move in several directions. Another approach involves the use of large, multi-directional treadmills (e.g., with belts crossing each other) on the floor of the VR space. However, these devices are mechanically complex as they employ myriad separate moving belts under the user. This results in a very noisy environment which can hamper the VR experience and can cause safety concerns with some prototypes using a special safety harness to avoid having the user fall down or being thrown off the device. Further, to date, the VR treadmills have only allowed one user at a time in the VR environment.

In a much simpler design, the user wears slippery shoes and stands in a bowl-shaped support platform. The user continuously slips to the bottom of the bowl as they try to walk forward in any direction. This provides a relatively poor approximation of distance walking, and the system has slip and fall hazards associated with its use. Again, the system is limited to a single user, who often is strapped in to allow the device to help pull her toward the center of the bowl-shaped support platform. In other VR systems, a spherical cage similar to a large hamster ball has been used, but these require a significant amount of space to implement and, again, are limited to a single user.

SUMMARY

The inventors recognized that a motion or "walking" system may be provided for inclusion in VR systems (and in other applications) that builds upon prior efforts to move an object on a surface. These prior efforts include a system for providing preferential (or changeable or differential) friction to objects supported by a vibrating surface. The "vibrating" surface may be, for example, an upper or contact surface of a moving X-Y element that is rapidly moved, in an alternating manner, in the X direction and then in the Y direction. The system may use a variety of technologies or techniques to selectively cause the object to grab or be attracted to the contact surface.

With this system, the object moves with the rapidly moving contact surface, in the X or in the Y direction, when the friction is higher to lock the object to the surface, but the contact surface moves without the object (underneath the object) when the friction is at a lower value. By selectively switching the friction or grabbing/locking force between the higher or lower value, the object can be moved about the contact surface in a controlled manner. If multiple objects are provided on the contact surface, each of the objects may be moved in an independent and/or individually controlled manner. In this past work, a surface of a table was vibrated first in the X direction and then in the Y direction, and objects on the table were able to vary their friction with the table's upper surface instantaneously to "grab" hold of the table when it is moving in the direction that they want to go and decrease their hold on the table to let it slide under them when the table returns to a home position.

Such "inch worm" type movement is extremely effective and can independently move objects in any direction on a vibrating surface and at relatively high speeds (e.g., when high table movement frequencies are utilized in the motion system). This prior device, though, would likely have limited use or application for moving multiple participants in a VR environment. Particularly, the inventors understood that it would generally be impractical to put people on a single huge platform and move the entire platform up and down and then left and right (in X and Y directions) and individually try to control each participant's friction with this huge vibrating surface.

In the new motion system taught herein for use with VR systems, it was determined that it is perfectly feasible to break such a vibrating surface into individual "active tiles" that together form the VR floor or support platform (which may be planar or substantially planar). Each active tile has a tile actuation system associated with it (e.g., provided underneath each tile) that moves the individual tile rapidly (but, typically, imperceptibly to the VR user) in the X and Y directions.

Additionally, the prior system is improved upon by configuring the motion system in how preferential friction is obtained. In some embodiments of the motion system, the surface of each active tile can be made to instantly vibrate up and down by its tile actuation system at a high frequency (e.g., 30 to 50 kilohertz (kHz) or higher frequencies) to provide movement of the upper tile surface in the Z direction. For example, the tile actuation system may include piezo-electric transducers to instantaneously provide this Z-direction vibration to reduce the friction between a user's shoe and the upper tile surface. In other exemplary motion systems, ultrasonic transducers are provided on the upper surface of the tile or on the lower surfaces of the user's shoes to selectively reduce the friction between the user's shoes and the upper tile surface.

Control signals from a controller are sent to a tile actuation system which synchronizes and phases the instantaneous X-Y movements of the tile with the instantaneous reductions in friction to move a VR participant or user standing on or walking on the tile in a VR floor or support platform. The movement may be in any direction such as in a direction that is opposite the present direction in which the VR participant is walking to avoid a collision with a wall enclosing the VR space or with another VR participant in the VR space. The VR participant may be walking or may simply be standing on a tile (and the movement provided by the tiles may be associated with a movement in the VR environment provided at that time by operations of the VR system).

The location of the VR participant and their direction of travel are monitored/determined (such as by the VR system's location tracking assembly/components), and their location and predicted travel direction and/or path in the space are used (along with the location and travel paths of other VR participants) by the controller to control a number of adjacent or nearby active tiles to control the VR participant's location within the VR space to avoid collisions or to otherwise position each of the VR participants within the VR space. With the new motion system, a VR system can operate to provide a VR environment with media displayed (e.g., on screens on the VR space walls or by VR headsets) and can portray huge vistas and as the VR participant moves (e.g., walks) toward an object in a displayed vista they can be moved subtly backwards (opposite their present direction of movement along their presently predicted travel path) in the VR space. In this way, the VR participant has the sensation of walking significant distances in the VR environment such as toward a distant object that may appear to become closer as the walking motion causes the space to be decreased but without ever reaching the walls of the VR space.

More particularly, a motion system is provided for moving objects in a space (e.g., moving VR participants about a VR space). The system includes a motion system controller and a position monitoring assembly. The system also includes a modular floor including a plurality of tile assemblies defining a support surface for a first and a second object. Each of the tile assemblies includes: (a) a planar tile with an upper surface for supporting the first and second objects; and (b) a drive system. The drive system includes a vibration-inducing assembly operable to oscillate the planar tile in a horizontal plane. Also, the drive system includes a preferential friction assembly operable to selectively reduce friction between the upper surface and any object supported upon the upper surface. In practice/operation of the system, the motion system controller generates control signals, based on position information for the first and second objects from the position monitoring assembly, to independently control operation of the tile assemblies of the modular floor to move the first and second objects on the support surface.

In some embodiments, the preferential friction assembly includes a plurality of ultrasonic transducers positioned on the upper surface of the planar tile. In other embodiments, the preferential friction assembly is provided as an array of ultrasonic transducers provided on or in the first and second objects (e.g., on or in the soles of the shoes worn by VR participants). In still other embodiments, the preferential friction assembly includes an actuator vibrating the planar tile to move the upper surface in the Z direction. In other embodiments, the vibration-inducing assembly includes an electric motor and a rotation-to-X-Y vibratory cam coupled to an output shaft of the electric motor and to the planar tile.

The motion system controller may be configured to determine a predicted path for the first and second objects and a distance to other objects in the space and, in response, to generate the control signals to move the first and second objects to avoid contact with the other objects. In the same or other embodiments, the motion system controller is configured to determine a predicted path for the first and second objects and generate the control signals to move the first and second objects in a direction opposite a direction of travel along the predicted path. The objects that are moved on the active tiles may be footwear of first and second participants of a virtual reality (VR) environment, and the control signals can then be generated to independently move the first and second participants in a first direction and a second direction that differs from the first direction.

DETAILED DESCRIPTION

Figure 1A:
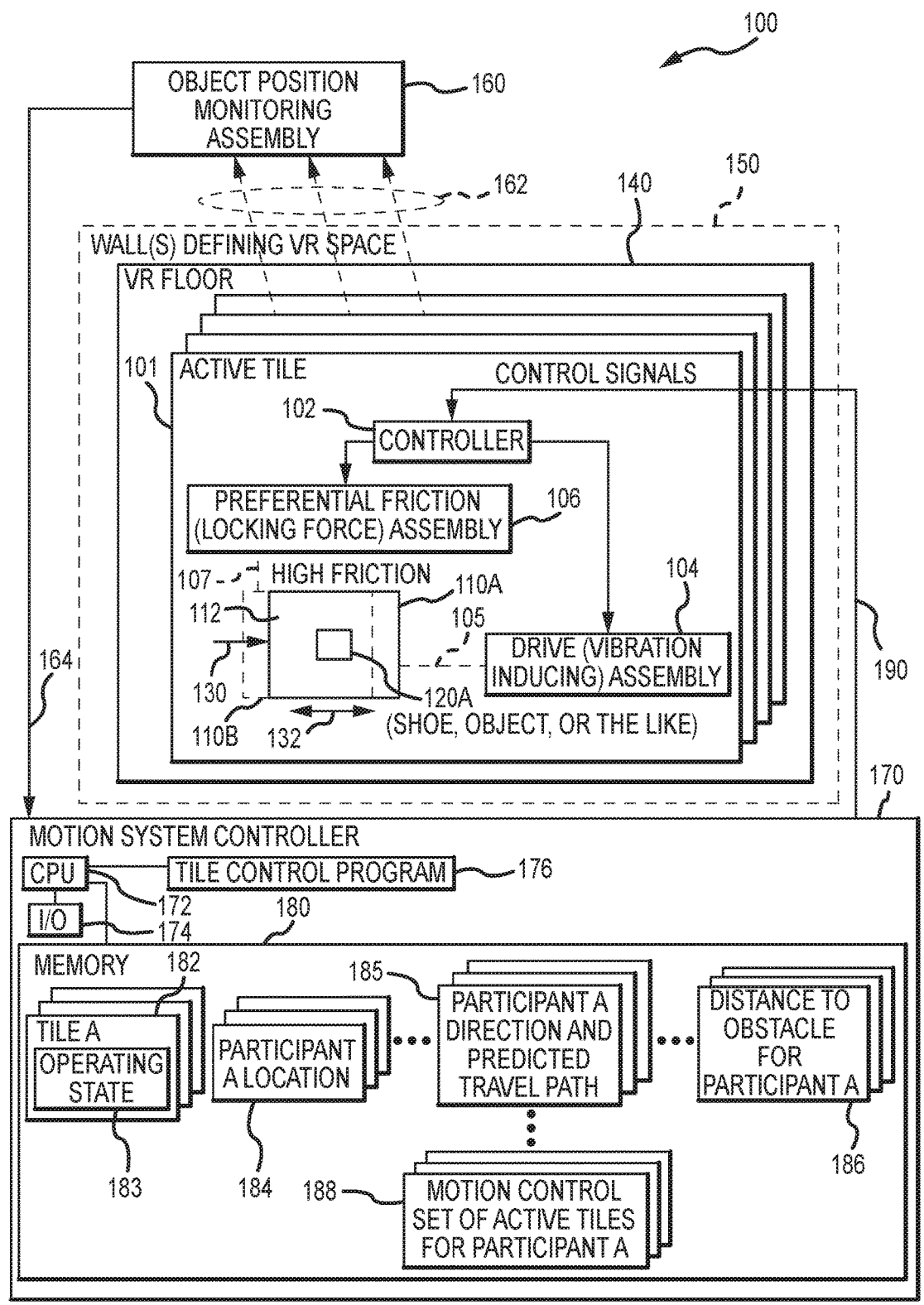
FIGS. 1A-1D illustrate functional block diagrams of an exemplary motion system (implemented as part of a VR system) using preferential friction (or a selectively applied attractive force) combined with a rapidly vibrating contact surface (a top or upper surface of modular floor or platform made up of upper or contact surfaces of a plurality of active tiles) to walk or move objects in a controlled manner.
Figure 1B:
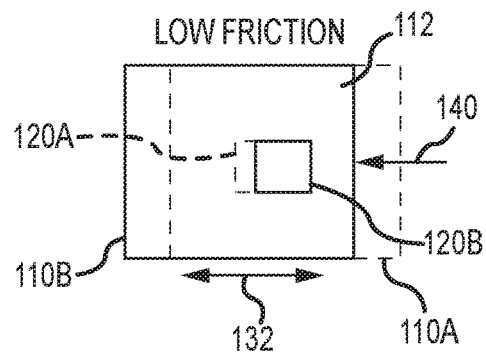

Briefly, a motion system is provided that is specially adapted to independently move multiple objects in multiple (and, often, differing) directions across its upper support surface. The motion system includes a modular floor with an upper support surface provided by a plurality of active tiles arranged in a side-by-side or adjacent design or pattern with small (e.g., 0.25 inches or less) spacing between the tile edges/sides. The tiles are "active" in that each tile can be independently operated or driven separately to move an object upon its upper surface in any direction (any direction in a horizontal plane defined by the upper surfaces of the active tiles). The object may be a virtual reality (VR) participant/user or, more specifically, a shoe or foot of the VR participant presently being supported by the active tile's upper surface, and motion system can control (with a motion system controller) a set of the active tiles to move each object about the upper surface of the modular floor by determining a present location of the object (e.g., the VR participant), by predicting a path for the object (e.g., is the VR participant facing a particular direction and walking/moving in that direction or standing still?), by determining the presence of any objects in the predicted path, and by selecting a group or number of the active tiles to impart a motion to the object (e.g., move the VR participant in a direction opposite of their current direction of travel along the predicted path to avoid a collision (e.g., with a wall defining a VR space or with another VR participant in the VR space)).

The present description will first provide a general description of how each active tile in a motion system may operate to move an object in the context of a VR system (e.g., system 100 of FIG. 1) and then turn toward specific active tile implementations. The description also will provide a control method for use in operating a motion system with a plurality of active tiles to concurrently affect motion of multiple objects in multiple directions.

Each active tile may be thought of as a system adapted for selectively applying a preferential friction or attractive/locking force to objects on or contacting a contact surface or upper surface of the tile. The contact surface may be the planar surface (e.g., the upper surface) of a vibrating element. The vibrating element or active tile is caused to move first in an X-direction and then in a Y-direction (in a first direction and then in a orthogonal second direction), and the movement is very rapid and the direction is altered over time. By applying an increased friction or attractive/locking force to an object (such as a VR participant's shoe) on the contact surface, the object can be caused to move with the vibrating element or active tile in the X or Y direction. Then, by lowering the friction or attractive/locking force, the object is released or unlocked from the contact surface, and the object remains in place (generally) while the vibrating member or active plate moves relative to the object in the X or Y direction. In this manner, an object can be moved about or positioned on the contact surface of each of the active tiles in a modular floor of a motion system in a controlled manner (e.g., by controlling the application of increased friction or locking forces).

Prior to turning to the figures and particular implementations of an object positioning system (or haptic touchscreen system), it may be useful to more generally describe the concepts and functions that facilitate such an active tile system to be effectively implemented. Each active tile can be thought of as including a drive system that applies a subtle horizontal vibration to the tile's contact surface in the X and Y directions while simultaneously either locking an object to the contact surface or releasing it in a manner phased to the X and the Y vibrations.

For instance, a Z-direction vibration of the active tile (or its contact surface) may be used to lock or unlock (or disengage) a finger (or a grounded object) to or from the contact surface of the vibrating element (e.g., a touchscreen device, a display device, a game component, or the like) thus during a first stroke of a horizontal vibration when the surface is not in its high friction state or locked state, so that the entire contact surface essentially slides under the finger or other object. Then, during the return or second stroke of that vibration, the Z-direction vibration may be halted (or lowered to some preset lower value) so the object moves with the contact surface, and then the cycle may start over. Each "ratcheting" movement of the object provides only a small movement of that object with respect to the contact surface, but the X-Y drive system of each active tile in the modular floor of a motion system can operate rapidly (e.g., at 30 to 50 Hz rates or other higher frequencies). Hence, the cumulative effect can be large displacement in any direction as the attractive/locking force can be phased with any combination of horizontal impulses.

FIGS. 1A to 1D illustrate a functional block diagram of a motion system 100 with a plurality of active tiles 101 in four operating states showing movement of an object (e.g., a shoe of a VR participant) in an X-direction. The active tiles 101 of the motion system 100 are arranged to provide a single planar support surface or to provide a VR floor 140 (or support platform in a non-VR application). The VR floor 140 may be surrounded by a wall (or walls) 150 that define a space for providing a VR experience or VR environment such as when VR participants (not shown in FIG. 1A) wearing VR headsets are positioned on the contact surfaces 112 of the active tiles 101 of the VR floor 140. An object position monitoring assembly 160, such as typically provided with a VR system, is provided in the motion system 100 to collect or sense information 162 to determine a present position (and direction, in some cases) of one to many VR participants (or other objects) on the VR floor 140. This location information is transmitted as shown at 164 to a motion system controller 170.

The motion system 100 includes a motion system controller 170 to generate control signals 190 to be used by the controller 102 of the drive systems of each active tile 101 to independently operate (relative to the other tiles 101) to move the object 120A (e.g., a VR participant's shoe) in a desired direction on the VR floor 140. To this end, the motion system controller 170 includes a processor 172 that manages operations of input/output (I/O) devices 174 such as a wired/wireless transceiver for communicating as shown at 164 and 190 with the position monitoring/tracking assembly 160 and the controller 102 of each active tile 101. The I/O devices 174 may also include a mouse, a touchscreen, a touchpad, and the like for allowing an operator of the motion system 100 to provide user input such as to select and/or initiate the tile control program 176.

The tile control program 176 is software (e.g., computer executable code or instructions in computer readable storage media) that is used to process the location data 164 and, in response, to generate the control signals 190. Particularly, the controller 170 includes memory 180, and the memory 180 is operated by the CPU 172 to store a record 182 for each active tile 101 with its present operating state 183. For example, each active tile 101 may be operated independently to have its drive system vibrate its contact surface 112 in a particular manner while also providing preferential friction or locking forces in a synchronized/phased manner to move an object on its surface or the active tile may be "Off" or in standby operating mode awaiting signals 190 to move an object on its contact surface 112 as needed to avoid collisions or otherwise guide the object across the VR floor 140.

To this end, memory 180 is shown to store at 184 the present location of each object in the VR space or on the upper surface of the modular floor 140. Further, memory 180 stores as shown at 185 a present direction in which the object (e.g., VR participant) is facing or "traveling" and also a predicted (or desired) travel path for that object (e.g., which way is the VR participant facing and are they standing still or walking/moving in the direction they are facing, which way is an object being directed according to a defined path and where should the object be moved in the future to affect travel along the defined path, and the like). The tile control program 176 is typically configured to determine these values.

Further, the control program 176 acts to determine distances 186 for the object/participant from their current location 184 to locations of other objects (other VR participants and so on) or the VR space wall 150. Based on the information 185 and 186, the control program 176 acts to choose a set of the active tiles as shown at 188 for each object/participant to affect desired motion for the object, and the control program 176 then defines the operating state 183 for each of the active tiles 182 in this motion control set 188. Control signals 190 are then transmitted to each of these active tiles 101 to cause their controller 102 to affect such operating states/operations to move an object 120A in a desired manner (e.g., move a VR participant's shoes in a direction opposite the one they are presently attempting to travel so as to avoid a collision with a VR wall or another VR participant).

The active tile 101 is shown in FIG. 1A to include a controller 102, such as a computer or computing device with a processor performing particular functions desired herein when running executable code or software programs provided in non-transitory computer readable medium or memory. The controller 102 may initiate and control operation of a drive (or vibration inducing) assembly 104 and a preferential friction (or locking force) assembly 106, and may process received control signals 190 from the motion system controller 170. The active tile 101 (or its drive system) further includes a vibrating element 110A and 110B such as a structural/rigid tile or plate or the like with an upper or contact (or touch) surface 112 upon which one or more objects 120A-120D may be placed or supported (e.g., one or more shoes of a VR participant).

FIG. 1A shows that during operation of the drive system of each active tile 101 the controller 102 may use or operate the drive assembly 104, which may be physically connected or in contact with the element 110A as shown at 105 or be proximate enough to apply forces to the element 110A, to cause the element 110A to vibrate in the X-direction. This transitional movement is shown with arrow 132 and with FIG. 1A showing the vibrating element 110A and 110B in first and second positions (first and second X-axis positions). The drive assembly 104 may take many forms to practice the system 100, and a number of useful embodiments for the assembly 104 for creating rapid movement (X and Y movements, for example) of the contact surface 112 are described below in the following examples.

The controller 102 may also operate the preferential friction (locking force) assembly 106, which may be connected (wired or wirelessly) to the element 110A or object 120A as shown at 107, to selectively generate or apply an attractive or locking force between the object 120A and the contact surface 112 (or to the vibrating element 110A). For example, the object 120A may be switched between low and high friction states with the preferential friction assembly 106. As with the drive assembly, the preferential friction assembly 106 may take a number of forms to practice the system 100 with a main goal being that the applied or generated force be adequate to "lock" (make it relatively difficult for sliding to occur) the object 120A to the contact surface 112 and then "unlock" or release (make it relatively easy for sliding to occur) the object 120A from the surface 112. The controller 102 and assemblies 104, 106, 108 are only shown in FIG. 1A (for simplicity of explanation and to avoid repetition) but should be understood to also be in use in the system 100 shown in FIGS. 1B-1D as well as the system 200 of FIGS. 2A and 2B (and other systems taught herein).

FIGS. 1A to 1D are useful for explaining operation of the drive system of each active tile 101 with its drive system being operated through two full strokes, e.g., the arrow 132 shows that the vibrating element 110A and 110B moves back and forth along a first axis (i.e., in the X-direction or along the X-axis in this example) and a "stroke" may be the combination of a movement to the right and then a movement back to the left. FIG. 1A shows the vibrating element 110A in a first horizontal position (moved to the right) and, with dashed lines, the vibrating element 110B in a second horizontal position (the position to the left or along the X-axis where the surface 112 was originally prior to movement to position 110A). This movement is repeated as the element 110A and 110B is vibrated or moved back and forth in an oscillatory manner by the drive or vibration assembly 104 as shown at 105.

With reference to FIG. 1A, the vibratory element or member is moved to the right, as shown at 110A and 110B, by a force 130 applied by the drive assembly 104. Concurrently, the preferential friction assembly 106 is operated to create high friction (or a locking force) between the object 120A, and this high friction operating mode of system 100 causes the object 120A to be essentially adhered to the contact surface 112 by high friction (which may be adjustable via assembly 106 and controller 102 to suit the object 120A and/or surface 112) with surface 112. As a result, the object 120A moves 132 with the surface 112 (as the vibratory element moves from 110B to 110A).

Once (or towards the end or second half of this first or right-moving half of the stroke) the table/element is moved to the right as shown with reference number 110A, the controller 102 may operate the preferential friction assembly 106 to create a lower amount of friction between the object 120B and the surface 112 (e.g., to release the locking or attracting force). Concurrently, surface 112 is moved, such as with substantially high acceleration, by operation of the drive assembly 104 from a first or right-most position of element 110A to a second or left-most position of element 110B (back to its standing position) via application of force 140. During this phase of operation or second half of the full stroke of system 100, the friction between the object 120B is reduced using the assembly 106 and object 120B maintains its approximate position (with respect to the Earth) due to its inertia. As a result, the object 120B has shifted a distance to the right with respect to contact surface 112 (i.e., has positive translational movement relative to the X-axis).

Figure 1C:
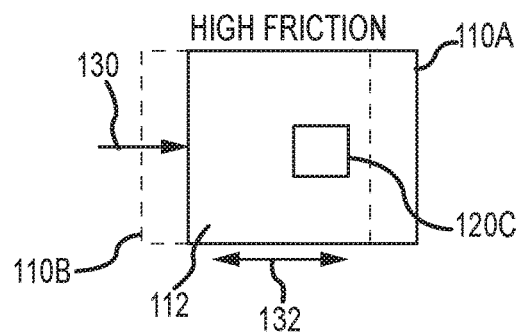

The cycle is repeated or a new stroke begins in FIG. 1C where the force 130 is applied again by the drive assembly 104 to again move the surface 112 to the right as shown with the element 110A moved from the prior or left-most position. Concurrently, the controller 102 operates the preferential friction assembly 106 to provide higher friction between the surface 112 and the object 120C (e.g., a magnitude of friction that is adequate to at least partially lock the object 120C upon the surface 112 such that the object 120C moves at least a fraction of the distance to the right with the surface 112).

Figure 1D:
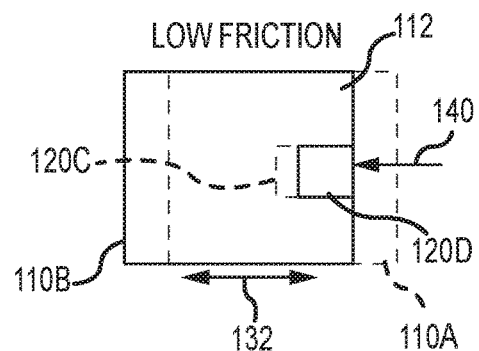

Next, as shown, in FIG. 1D, the return force 140 is again applied by the drive assembly 104 on element 110B to move it a distance to the left (from a first X-coordinate/position as shown in FIG. 1C to a second X-coordinate/position). The locking force or higher friction is removed by the operation of preferential friction assembly 106 to place the system 100 in a low friction state or operating mode. As a result, the object 120D maintains its approximate position relative to the Earth but as shown in FIG. 1D the object 120D has moved to the right relative to the oscillating surface 112. In this manner, the object 120A-120D can be walked or "inchwormed" across the surface 112 in either direction along the X-axis or moved in X-direction (positive or negative). With the object position monitoring assembly 160, the X coordinate or location of the object 120A-120D can be determined over time, and the controllers 102 or the set of tiles (as defined at 188) may selectively operate the preferential friction assemblies 106 to move the object 120A-120D some distance to the left or right over time to move the object (e.g., a VR participant) as desired on the VR floor 140.

Figure 2A:
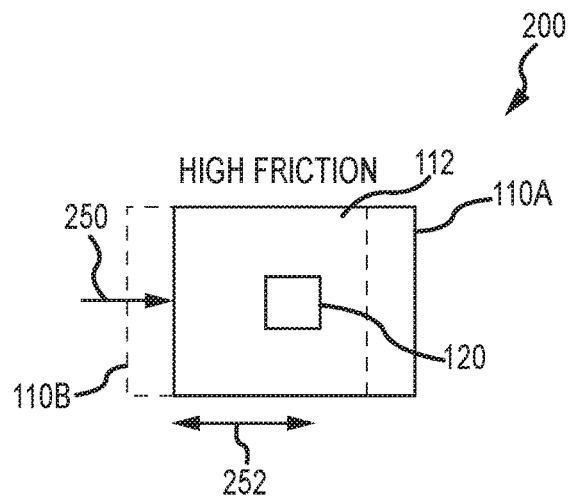
FIGS. 2A and 2B illustrate functional block diagrams of an exemplary active tile using its drive system to move an object in both X and Y directions (concurrently or sequentially)
Figure 2B:
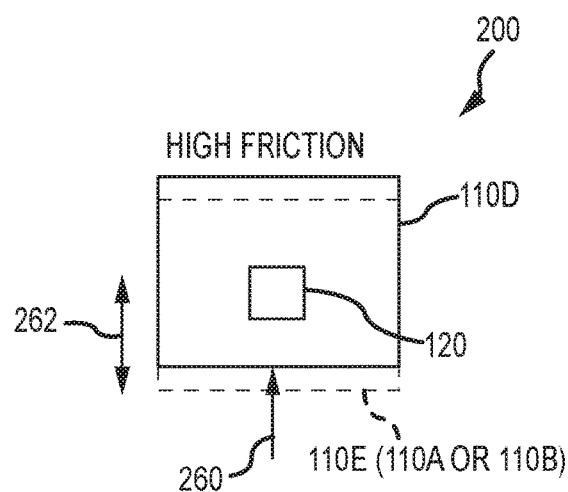

The concepts behind the system 100 may be used to move objects in arbitrary directions by creating two transverse (or non-parallel) axes of movement. For example, FIGS. 2A and 2B show an active tile 200 being operated, respectively, to move an object 120 along a first axis (e.g., the X-axis) and then along a second axis transverse to the first axis (e.g., along the Y-axis). As shown, it may be useful to drive or vibrate a table or element 110A, 110B, 110D, 110E along orthogonal axes while selectively creating a high friction and a low friction state between the object 120 and the contact or upper surface 112 of the element 110A, 110B, 110D, 110E. This allows the drive system of the active tile 200 to provide perpendicular or X-Y movement directions for the object, but it will be understood the system 200 may be configured to provide rotary and the axial movement to position an object 120.

As shown in FIG. 2A, the active tile 200 is operated to vibrate or oscillate 252 the contact surface 112 in the X-direction or move it back and forth along the X-axis. As shown in FIG. 2B, the drive system of the active tile 200 is operated to vibrate or oscillate 262 in the Y-direction or move it back and forth along the Y-axis. If high friction is provided between the object 120 and the surface 112, the object 120 will move with the surface 112, e.g., from a first position of element 110B to a second position of element 110A and from a lower-most position of element 110E (e.g., with an X-axis position of 110A, 110B as shown in FIG. 2A or a position there between) to an upper-most position of element 110D. Forces 250 and 260 are applied sequentially or fully or partially concurrently to shake 252, 262 the table in the orthogonal directions.

The amount of movement and direction of the object 120 on the surface 112 is controlled by how often and when the low friction state is excited (i.e., to release the locking force and allow the object 120 to remain in a new position rather than returning with the surface 112 in the second half of each stroke of the element 110A, 110B, 110D, 110E). The amount or magnitude of movement per step can be controlled by adjusting the amplitude of movement (distance traveled from a first position of element 110A to a second position of element 110B or from a lower-most position of element 110E to an upper-most position of element 110D), the number of oscillations, and/or the amount of acceleration per move (especially during the low friction position of the movement where the surface 112 is free to slide under the object 120).

As discussed above, a wide variety of driving systems may be utilized to provide the X-Y vibratory movement of each tile/plate in a modular floor. For example, any of the drive systems or assemblies used for providing X-Y motion in U.S. patent application Ser. No. 13/874,228 ("Magnetic and Electrostatic Vibration-Driven Haptic Touchscreen"; U.S. Pat. Appl. Pub. No. 2014/0268515), which is incorporated herein in its entirety, may be utilized in the active tiles 101 such as to provide the drive assembly 104 and/or the preferential friction assembly 106 of FIG. 1.

Figure 3:
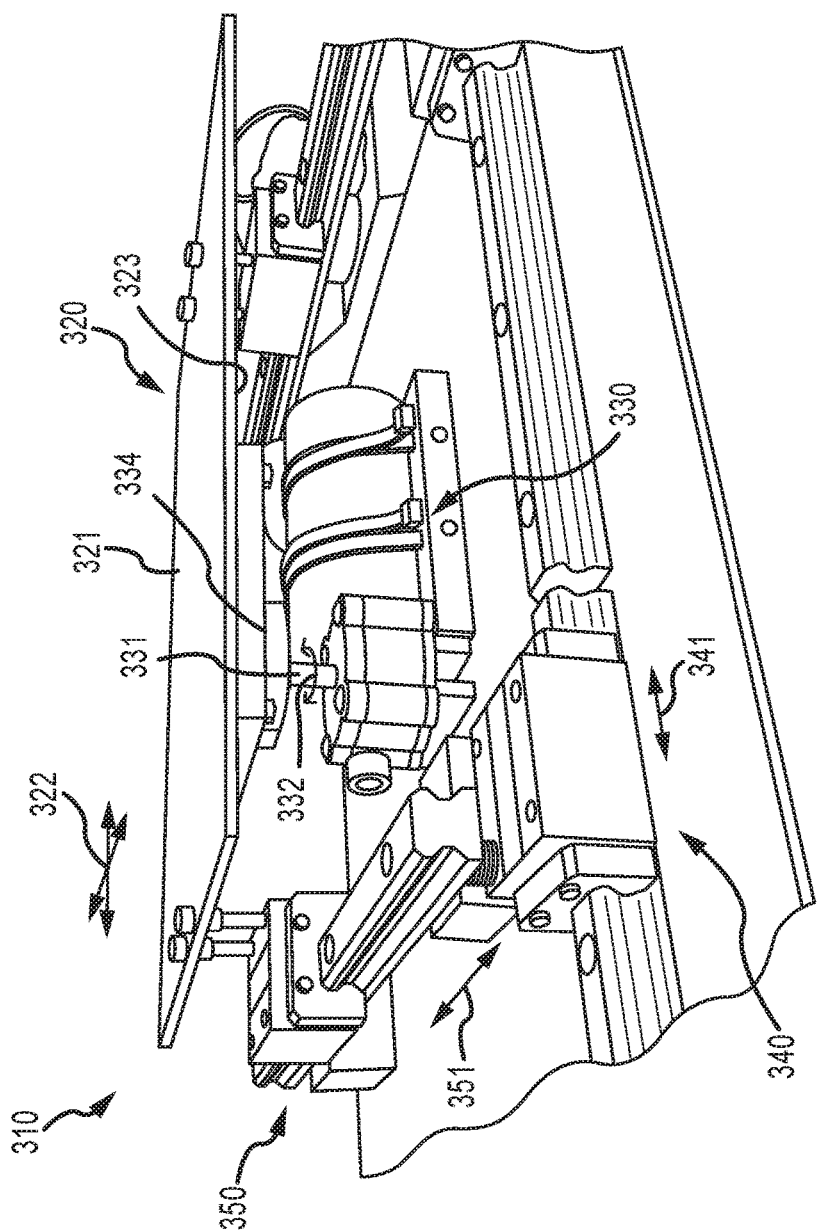
FIG. 3 illustrates an exemplary implementation of an active tile or tile assembly as may be used to fabricate, in combination with a plurality of other active tiles or tile assemblies with similar configurations, a modular floor of a motion system.

FIG. 3 illustrates an exemplary implementation of an active tile or tile assembly 310 as may be used to fabricate, in combination with a plurality of other active tiles or tile assemblies with similar configurations, a modular floor of a motion system (such as the floor 140 in the motion system 100 of FIG. 1). The active tile assembly 310 of FIG. 3 includes a support plate or tile 320 with a planar upper or contact surface 321 and a lower or attachment surface 323 opposite the upper surface 321. The tile 320 may be formed of a rigid material such as metal, a plastic, a ceramic, or the like and may take a variety of shapes and sizes. In some implementations, each tile 320 has a square upper surface 321 with 1-foot sides, but other shapes such as rectangular or triangular may be used and larger (or smaller) contact surfaces 321 may be desirable in some modular floors. During operation of the active tile 310 the tile 320 and its contact surface 321 is caused to be smoothly moved rapidly with almost no "impulsive knock" in the X and/or Y directions as shown with arrows 322. Transducers may be provided on the surface 321 or in a user's shoes, as discussed with reference to FIGS. 4-7 below, to break or overcome (interrupt) Coulomb friction between an object supported on the contact or upper surface 321 while the X and Y movements 322 are used (in a synchronized manner with reduced or increased friction) to move the object relative to the contact surface (as discussed throughout this description) in synchronization with operation of the transducers.

To provide the X and Y directional movement or vibration, an actuator or motor 330 is provided that is coupled with the lower surface 323 of the tile/plate 320. To provide the X and Y direction vibratory movement, the central motor 330 is operated to rotate 332 a vertical shaft 331. The shaft 331 extends into and is coupled with a cam assembly 334, which is affixed to the lower attachment surface 323. The vertical shaft 331 by its rotation 332 rotates a horizontal cam in the assembly 334, which rotates inside a cam-follower plate of the assembly 334. As the motor 330 rotates 332 the cam, the cam follower, which is attached to the bottom surface 323, moves the plate/tile 320 and upper contact surface 321 in a cyclical X-Y manner as shown at 322 going through the compass points (e.g., North, South, East, and West) in sequence.

Two pairs of railed or linear coupling units 340 and 350 are provided in the active tile 310 to keep the tile/plate 320 from rotating as it moves 322 back and forth and left and right. The lower linear coupling units 340 allow/facilitate a first linear movement as shown with arrows 341, and the upper linear coupling units 350 are supported upon the lower coupling units 340 to move 351 with the lower linear coupling units 340. The upper coupling units 350 are coupled to the lower surface of the tile/plate 320 to allow the first linear movement of the tile/plate (e.g., the X or Y direction movement) driven by the motor 330 and cam assembly 334.

As discussed above, the movements 322 are of a higher frequency such as 50 Hz and are relatively small in magnitude but, when synchronized with the Z-directional break in friction by an array of transducers on the upper surface 321 (see FIG. 5) or in a user's shoe (see FIG. 7), an object on the contact surface 321 can be moved effectively in any direction. Briefly, the object sticks when the plate 320 is moving slowly (e.g., attraction in the Z direction) and unsticks when the plate is moved quickly (e.g., friction broken or lessened in the Z direction). The motor 330 and cam assembly 334 combination is useful for providing such a fast movement in one direction and smooth in the other direction (fast/slow in cyclical manner). In other embodiments, though, linear actuators may be used in place of the motor and cam combination. In still other implementations, an active tile assembly may utilize solenoids/springs assemblies, gear/motor assemblies, linear motors, and the like to provide such push and pull motion to the plate/tile 320 and its contact surface 321.

Figure 4:
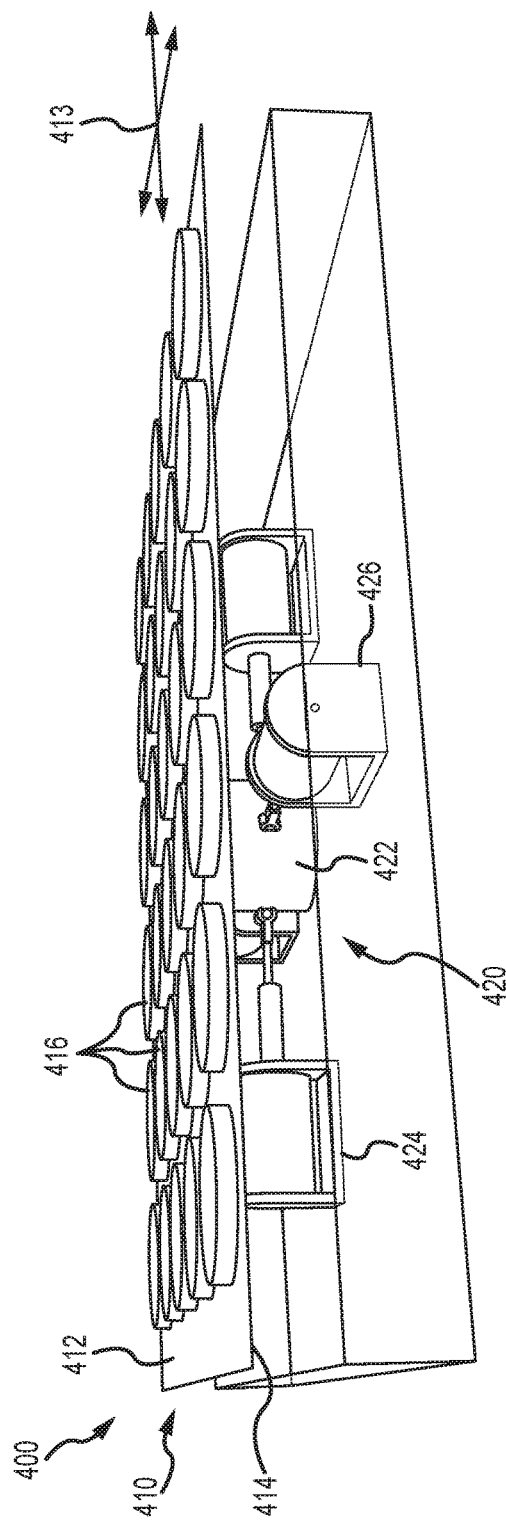
FIG. 4 illustrates a second exemplary implementation of an active tile or tile assembly as may be used to fabricate a modular floor of a motion system of the present description.

FIG. 4 illustrates a second exemplary implementation of an active tile or tile assembly 400 as may be used to fabricate a modular floor of a motion system of the present description. The active tile 400 of FIG. 4 includes a tile or plate 410 with an upper planar surface 412 and an opposite lower surface 414. The active tile 400 is adapted to provide preferential friction control via an array of ultrasonic transducers 416 that are positioned on the upper/contact surface 412 of the plate/tile 410. In use, an object such as a VR participant's shoe would contact one or more of the ultrasonic transducers 416, which may be bare as shown or which may be covered with a protective layer or sheet (not shown). When activated, the array of ultrasonic transducers 416 instantly lowers friction between any object on the tile 410 and the contact/upper surface 412.

During operations of the array of transducers 416, the plate/tile 410 is also moved (vibrated) in the X and Y directions as shown with arrows 413. This is achieved with a drive assembly 420 in the form of a central hub/support member 422 that is affixed to the lower surface 414 of the plate/tile 410. X-Y movers 424, 426 are provided that can be selectively operated by a controller (not shown in FIG. 4 but may be as shown at 102 and/or 170 in FIG. 1A) to provide rapid (e.g., 30 to 50 Hz) pushing and pulling of the hub 422 and attached plate 412. The movers 424, 426 are shown in FIG. 4 as solenoids but other actuators may be used such as air or hydraulic pistons or the like.

Figure 5:
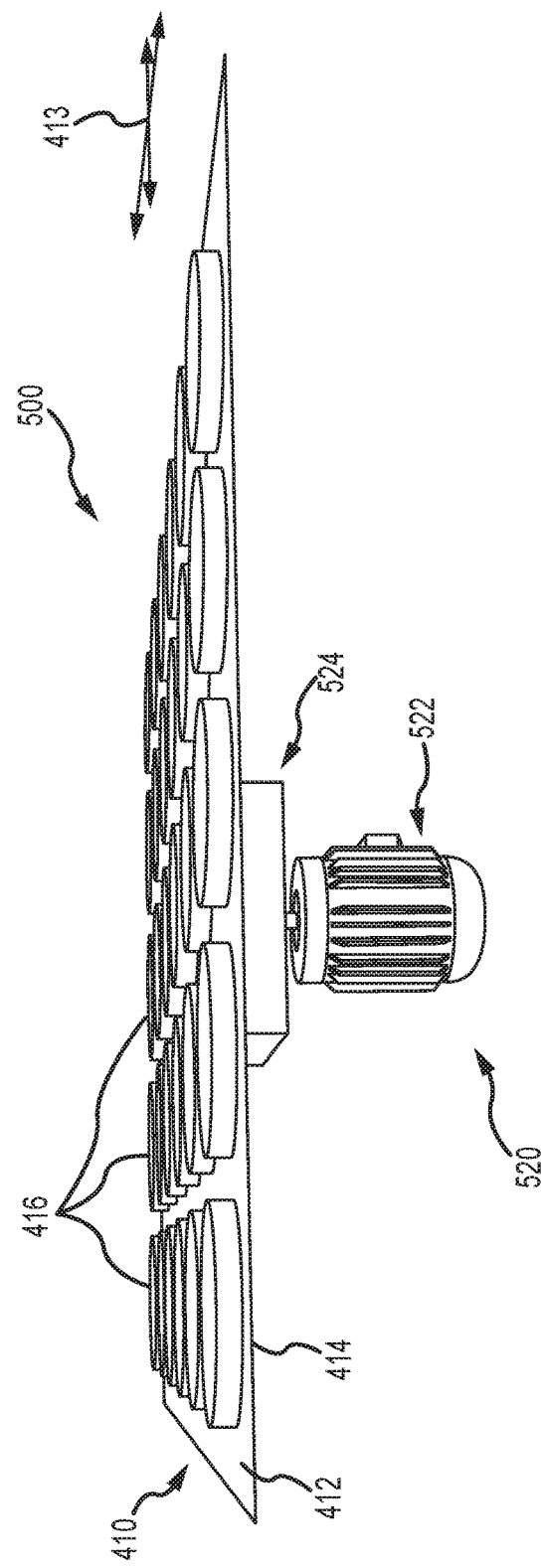
FIG. 5 illustrates a third exemplary implementation of an active tile or tile assembly 500 as may be used to fabricate a modular floor of a motion system of the present description.

FIG. 5 illustrates a third exemplary implementation of an active tile or tile assembly 500 as may be used to fabricate a modular floor of a motion system (such as system 100 of FIG. 1). In the tile assembly 500 of FIG. 5, a tile 410 with an array of ultrasonic transducers 416 are provided as in the assembly 400 to provide instantaneous friction control for any objects contacting or supported on the contact/upper surface 412. The tile 410 is also selectively moved in the X and Y directions as shown with arrows 412 as in assembly 400. In assembly 500, though, this motion 413 is provided by a drive system 520 in the form of an electric drive motor 522 with its output shaft (or drive shaft) coupled with a rotary-to-X-Y vibratory cam 524, which is coupled to the lower surface 414 of the tile or plate 410 such that the contact surface moves with this cam in response to input from drive motor 522. In this way, a single electric motor 522 can be used to provide the X-Y movement 413 rather than requiring a plurality of actuators as shown in FIGS. 3 and 4.

Figure 6:
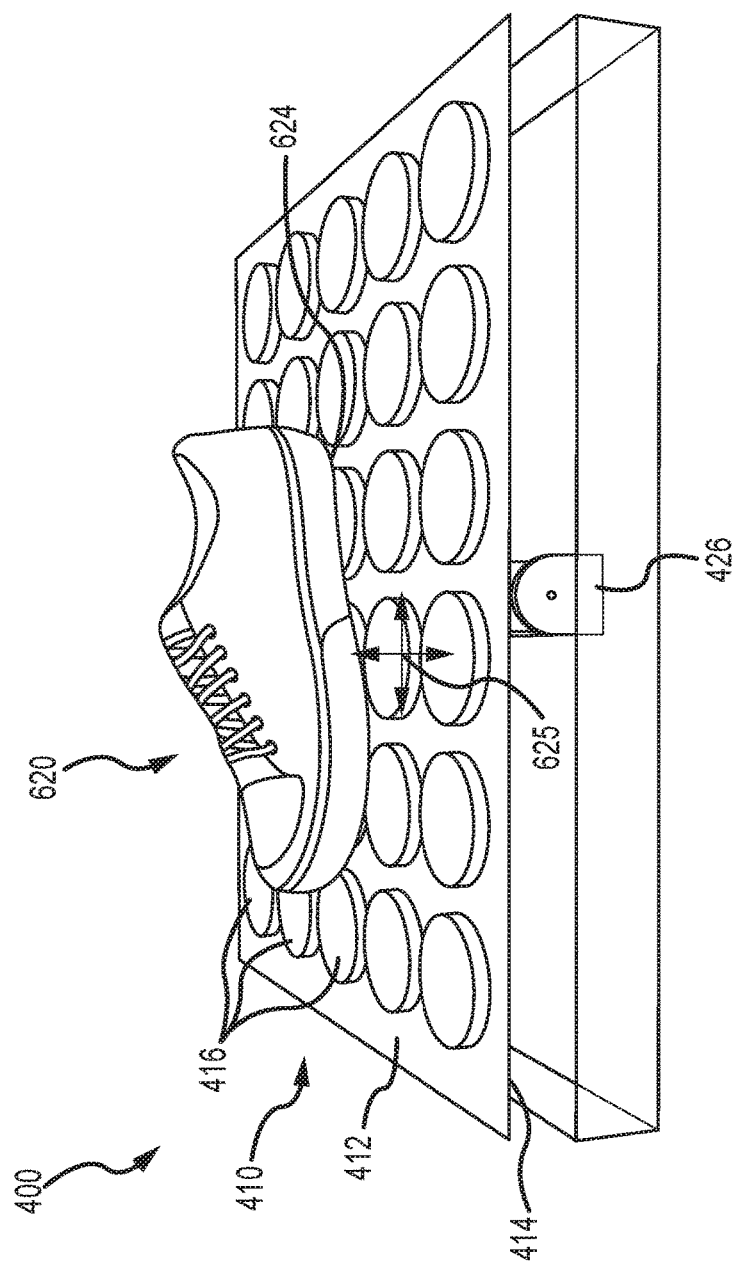
FIG. 6 illustrates the active tile of FIG. 4 during its operation or use to move footwear (or a shoe) such as would be worn by a VR participant in a VR system that includes a motion system of the present description with a modular or VR floor made up of numerous active tiles.

FIG. 6 illustrates the active tile 400 of FIG. 4 during its use, such as in combination with a plurality of other such active tiles in a modular floor, to move an object 620. As shown, the object 620 is a shoe (footwear) with a sole or lower contact surface 524 that is in contact or supported upon the upper surface 412 of the plate/tile 410 via the ultrasonic transducers 416. The sole/contact surface 524 may be relatively rigid (e.g., a semi-rigid hard plastic or rubber) and flat or planar to provide an appropriate surface for interacting with the transducers 416 to reduce friction. The operation of the transducers 416 is synchronized with operation of the plate/tile 410 and its movement 413 so as to selectively move the object 620 in any direction as shown with arrows 625. When the object 620 is a shoe or similar footwear, a person such as a VR participant may wear the object 620, and operation of the active tile 400 can be used as shown in FIG. 6 to move the VR participant in any direction via selective movement 625 of the worn/attached shoe 620 (e.g., in a direction opposite a present direction of walking/travel along a predicted travel path in a VR space or away from another object (such as a VR space wall) to avoid a collision).

Figure 7:
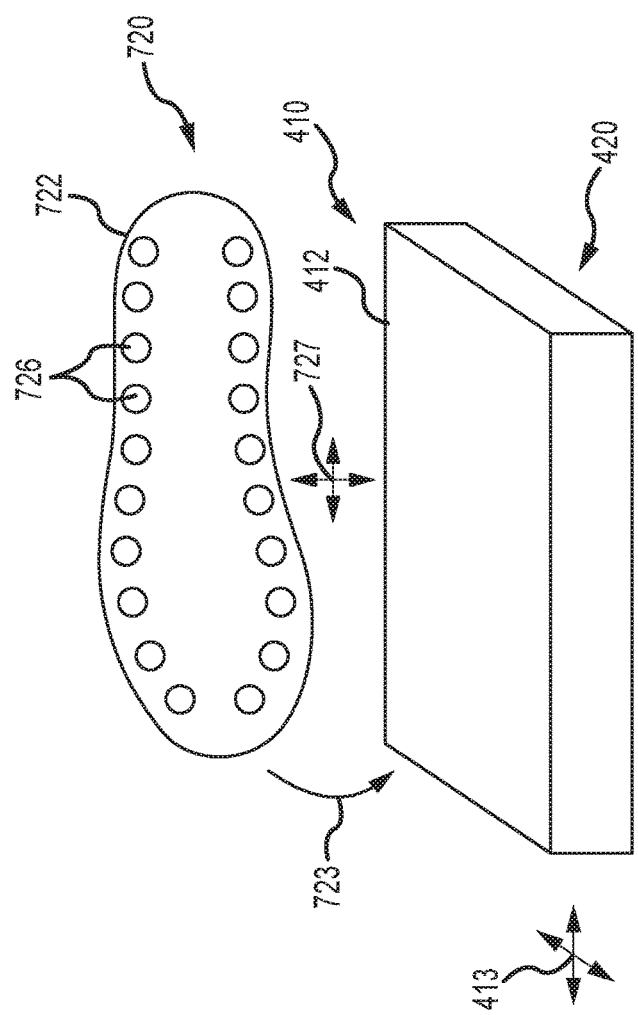
FIG. 7 illustrates a fourth implementation of an active tile and moveable object embodiment of the present description that is similar to the arrangement of FIG. 4 but with an ultrasonic transducer array provided on the bottom of the object rather than on the top/contact surface of the tile/plate.

FIG. 7 illustrates another drive system that can be used to provide motion of an object 720, which is shown as a shoe in this non-limiting example of an object configuration. As shown, the tile 410 again has a contact surface 412 and is driven with vibratory X-Y motion 413 by a drive assembly 420. In contrast to FIG. 4, though, the lower or contact surface or sole 722 of the object/shoe 720 is configured to include a plurality or array of ultrasonic transducers 726 rather than the surface 412 of the tile 410. In use, the object 720 is positioned as shown with arrow 723 in contact with the upper surface 412, and the ultrasonic transducers 726 have their operation controlled (e.g., by wired or wireless control signals from a controller of the drive system) to be synchronized with the motion 413 of the tile 412 so as to move 727 the object/shoe 720 in any desired direction (e.g., in an inch worm manner as discussed above). The power source for the transducers 726 is provided in the body of the object/shoe 720, and the transducers 726 may be bare/exposed as shown or a protective layer/sheet (not shown) may be provided to protect the transducers 726 from rubbing against the contact surface 412 of the plate/tile 410.

Figure 8:
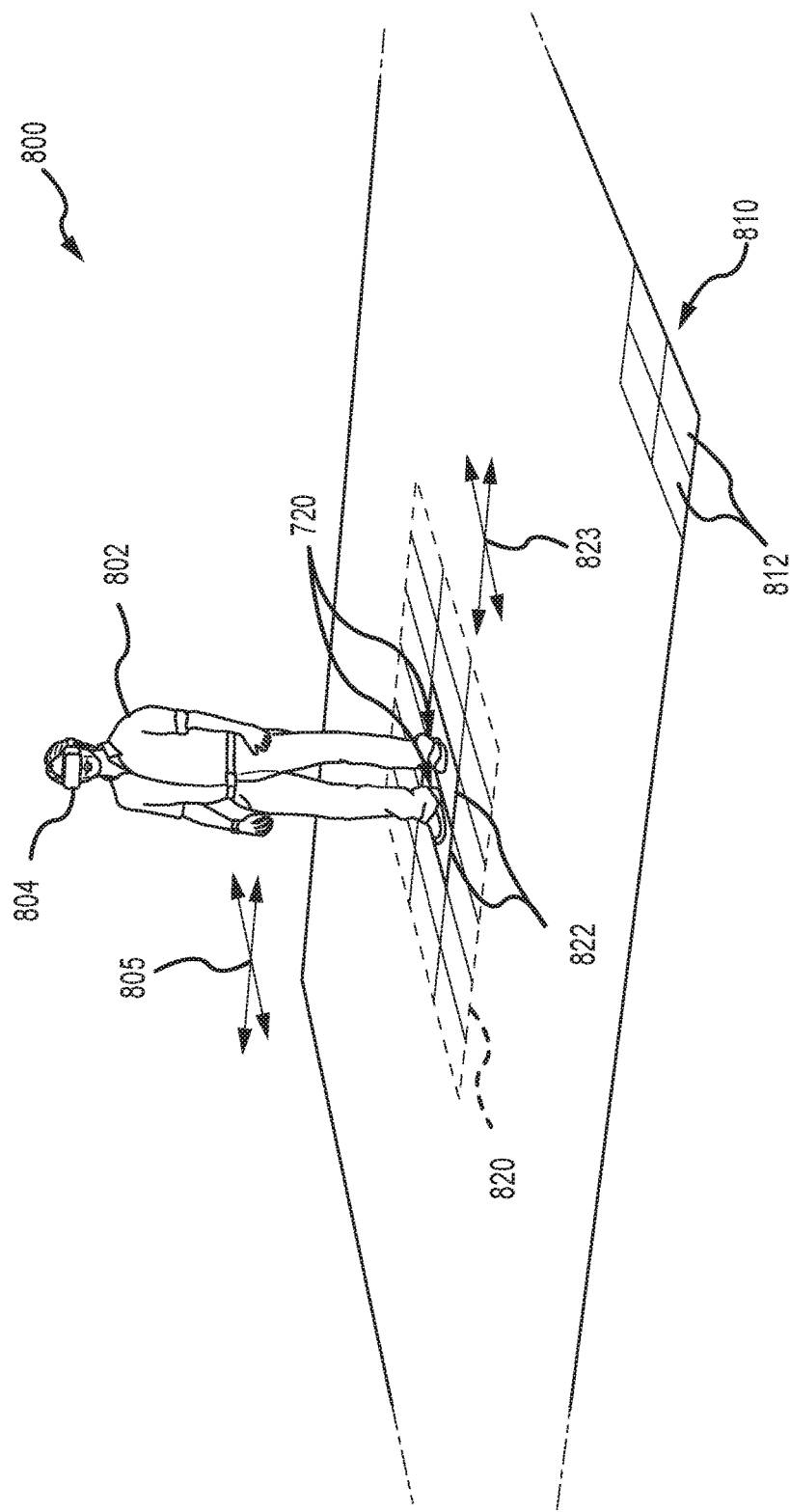
FIG. 8 illustrates a VR space with a VR or modular floor as described herein that is made up of a plurality of the active tiles and a pair of the moveable objects (e.g., a pair of shoes or footwear) shown in FIG. 7.

FIG. 8 illustrates a VR system 800 with a motion system of the present description in use to provide motion 805 to an object 802 in the form of a person wearing a VR headset 804. To this end, a modular floor 810 is provided that is formed of a plurality of active tiles 812 arranged in a side-by-side manner to provide a planar contact surface through the combination of all of their upper or contact surfaces. Each of the active tiles 812 may take the form of the active tile 400 of FIG. 410 shown in FIG. 7 (e.g., without ultrasonic transducers on the upper surface 412). The VR participant 802 is shown to be wearing a pair of the shoes 720 shown in FIG. 7 with the soles 722 and attached/embedded ultrasonic transducers 726 facing/contacting the upper surfaces of the active tiles 812 of the VR floor 810.

In the operating state shown in FIG. 8, the VR participant's shoes 720 are positioned on two side-by-side active tiles 822 (of the set of active tiles 812 of the VR floor 810), which may be concurrently and independently operated along with the ultrasonic transducers of the shoes 720 to provide selective movement 823, in any direction, of the shoes 720 and, as an additive or combined result, to the VR participant 805. In one working example, the VR participant 805 is rotated, e.g., by operating the VR floor 810 including tiles 822 and/or shoes 720 to cause the participant's left foot to move forward while moving the right foot backward with respect to the direction the participant 805 is presently facing (and vice versa to rotate in the other direction). The VR participant 802 is shown to be standing still in this example but could also be walking with the motions 823 and 805 being defined by a motion system controller to be opposite the present direction of travel along a predicted travel path (e.g., to avoid collision with one of the walls defining the VR space of system 800). In the standing still example, the motions 823 and 805 may be selected to move the VR participant 802 as desired to provide a sensation (e.g., motion that coincides with a VR experience provided concurrently by the VR headset 804) or to avoid another VR participant (not shown) or another moving object (not shown) on the VR floor 810 or in the space of the VR system 800.

Figure 9:
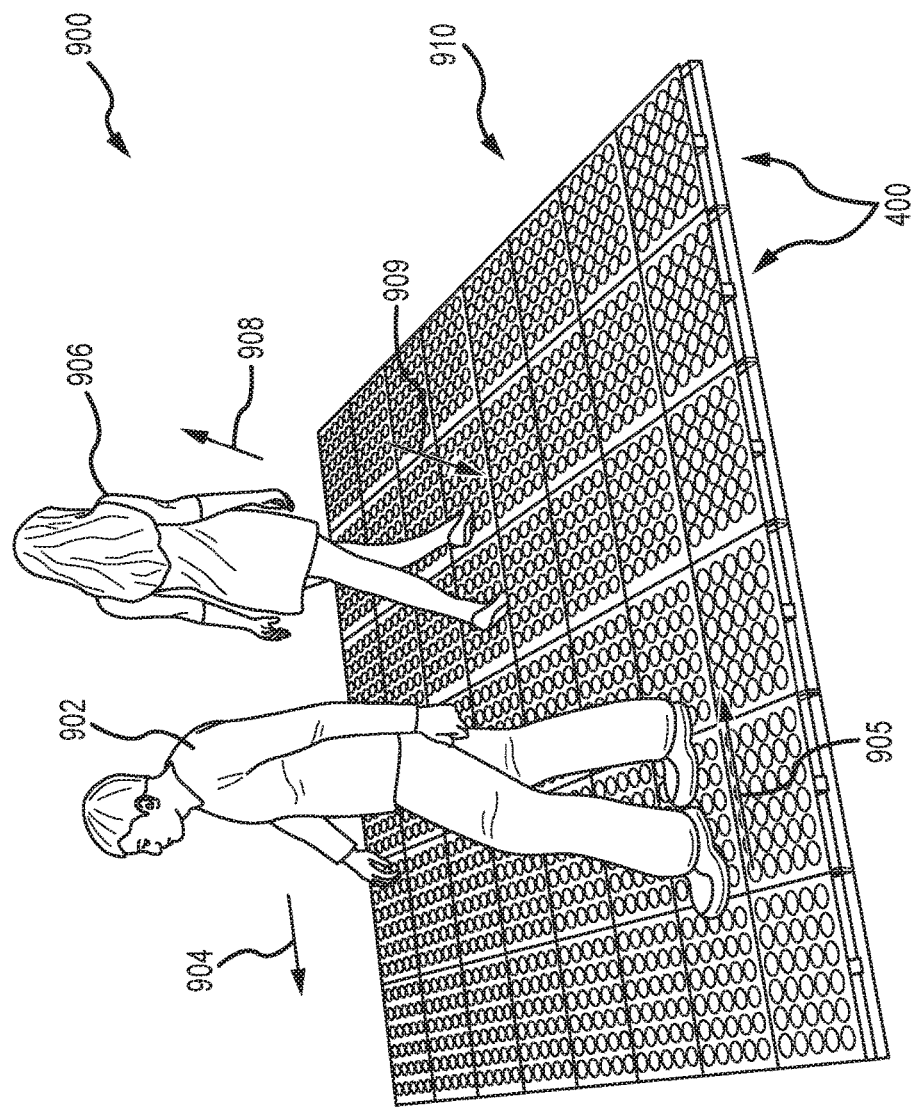
FIG. 9 illustrates another VR space with a VR or modular floor differing from that of FIG. 8 as it is formed with a plurality of the active tiles or tile assemblies as shown in FIG. 4 and also illustrating operation of the modular floor to control movement of two VR participants in the VR space who are moving independently and in different walking directions (along different travel paths)

FIG. 9 illustrates a VR system 900 with a motion system of the present description that includes a modular floor 910 formed with a plurality of active tiles 400. The active tiles 400 were shown in detail in FIG. 4 and include a drive system for providing X-Y vibratory motion and with ultrasonic transducers on their upper/contact surfaces for modifying friction between supported/contacting objects and the upper/contact surfaces of the active tiles. Again, each of the active tiles 400 may be operated independently to move any object upon their upper or contact surface.

As discussed earlier, the motion systems of the present description are particularly well-suited for use in providing motion over a plurality of objects on the modular floor 910 and its active tiles 400. As shown, for example, a VR system 900 may be used to support independent walking by two (or more) VR participants 902 and 906. The first VR participant 902 is walking in a first direction along a first travel path 904 while the second VR participant 906 is walking in a second direction along a second travel path 908 that differs from the first travel path 904.

The VR floor 910 may be operated (have its active tiles 400 operated) to allow the VR participants 902, 906 to walk under their own power for one to many steps. Then, when it is determined to be desired to modify this "natural" movement, a set of active tiles 400 associated to the present location and predicted travel path 904, 908 of each VR participant 902, 906 are operated concurrently and in a like manner for each participant 902, 906 to move in another direction. For example, the motion as shown with arrows 905, 909 may be opposite the current or predicted direction of travel 904, 908 so as to avoid a collision with a wall defining the space of the VR system 900, to avoid the other participant 902, 906, or achieve another desired result. The motions 905, 909 imparted to the VR participants 902, 906 are independent and concurrent even though it differs in this example. The motions 905, 909 may slow the movement 904, 908 by the VR participants 902, 906 or may even be at a rate that halts the motion (e.g., the people effectively walk in place) or that even reverses the motion (e.g., the people are moving 905, 909 at a rate that is faster than their walking pace).

Figure 10:
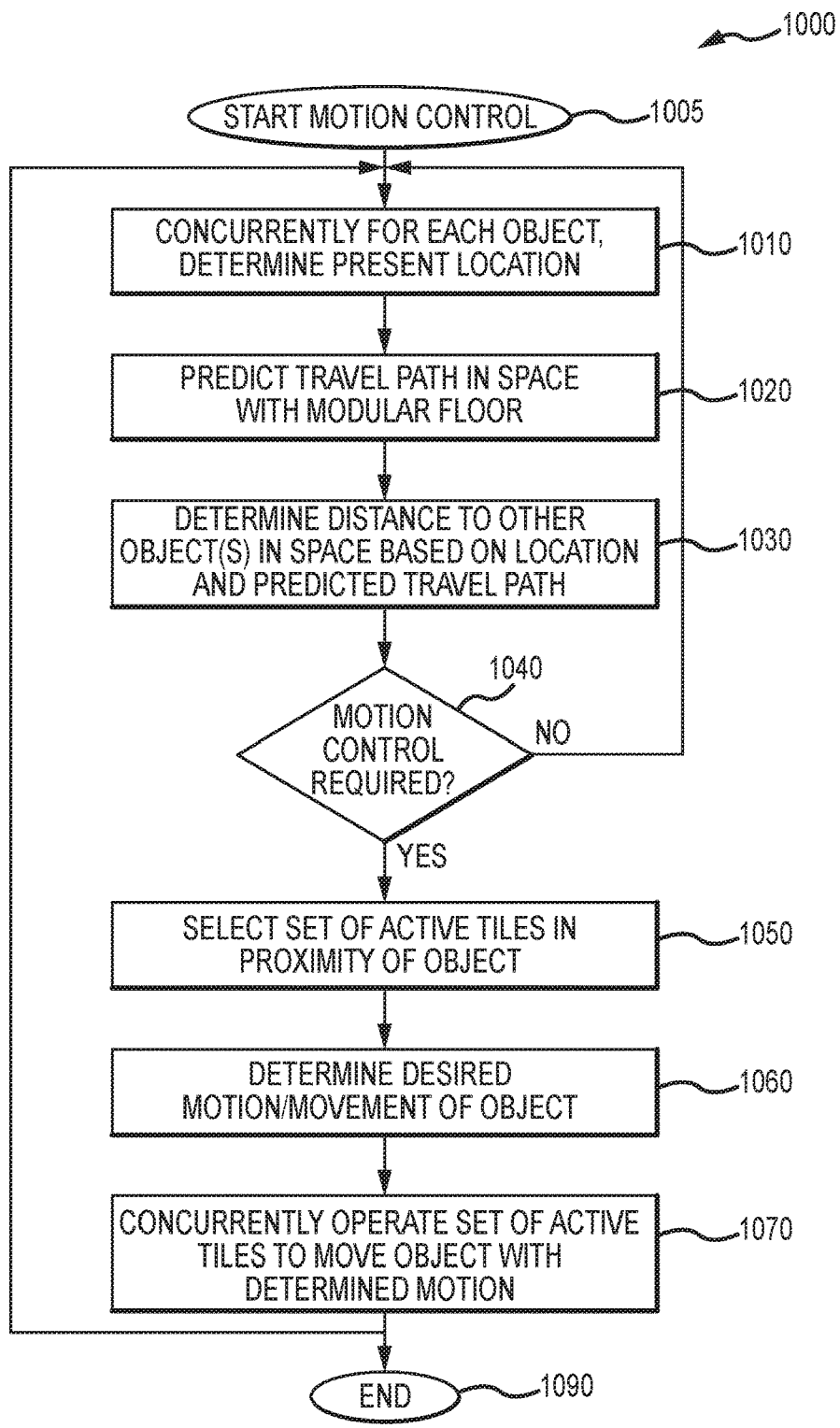
FIG. 10 provides a control algorithm or flow of operation of motion system controller as may be used during operation of a motion system of the present description (such as the system of FIG. 1).

FIG. 10 illustrates a control method 1000 for use in operating a motion system of the present description. This typically involves operating one or more of the active tiles or tile assemblies of a modular floor to move an object placed on the upper or contact surface of the modular floor through the use of X-Y directional vibrations (or rapid back and forth movements or shaking) combined with preferential friction between the object and the upper or contact surface of the modular floor (or each tile/plate making up the modular floor). The method 1000 starts at 1005 such as with installing a motion system in a space such as a space for providing a VR experience to two or more VR participants.

The method 1000 continues at 1010 with concurrently for each object in the space serviced by the motion system determining a present location of the object on the modular floor (e.g., which active tile(s) is the object supported upon). Then, at 1020, the method 1000 includes predicting a travel path in the space in an upcoming time period. This may involve determining which direction the object is facing or will be traveling and at what rate (e.g., how fast is the VR participant walking and which way are they facing?). At step 1030, the method 1000 continues with determining distances to other objects in the space based on the present location of the object and the predicted travel path. For example, a VR participant may be determined to be walking in a first direction along a linear path toward a wall enclosing the VR space, and step 1030 may determine that the VR participant is approaching the wall and is 6 feet from the wall.

The method 1000 continues at 1040 with determining whether or not motion control is desired such as to avoid collision with an object in the space or to affect a desired sensation or movement of the object through the space. If not, the method 1000 continues at 1010. If yes, the method 1000 continues at 1050 with selecting a set of active tiles in the modular floor that are to be operated to provide a desired motion or movement of the object. For example, step 1050 may involve determining the present location of the object and the predicted path, and based on this information, step 1050 may involve choosing one-to-many of the active tiles presently supporting the object and that will be supporting the object in an upcoming time period if the object continues along the present travel path (or where the object is to be moved by the imparted motion with the active tiles).

The method 1000 involves at 1060 determining the desired motion/movement of the object. For example, the information from steps 1010, 1020, and 1030 may indicate that the present movement of the object in the space has to be changed or a collision with an object will occur. In the VR example, a VR participant may be approaching another VR participant or may be approaching a wall enclosing the VR space, and step 1060 may involve determining a direction of motion that would be useful in avoiding the collision and, in some cases, a rate of such motion/movement needed. In the walking example, a VR participant may be moved at a rate and in a direction that equally opposes their walking pace and direction so that the VR participant walks in place or the rate may be greater such that the VR participant is actually moved away from the other object.

At step 1070, the method 1000 continues with concurrently operating all of the active tiles in the set defined in step 1050 to impart the desired motion on the object (e.g., to move the VR participant via their feet/shoes in a direction and at a rate desired) via X-Y directional movements combined with selective changes in friction values between the object and the contact surfaces of the active tiles. The method 1000 may then continue at 1010 or end at 1090 (and the method 1000 may end at any time such as by powering down the motion system performing/implementing the motion control method 1000).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The motion system can be used in VR systems and other applications to provide infinite walking (or movement of an object) on a flat and stable surface. In the VR setting, it can provide multiple users complete freedom in choosing a walking direction. Although the motion system has moving parts, the amount of movement of any of the constituents is extremely small and vibratory in nature. Further, the movement occurs at either subsonic or ultrasonic frequencies so that the moving system as a whole is quiet and should be essentially maintenance free.

Other applications for the motion system may include moving, multi-directional sidewalks (e.g., moving walkways at airports or the like). The motion system, of course, may be used to move objects other than people. For instance, the motion system may be used to move objects such as cargo and luggage at an airport, and, in some cases, the motion system could also be used to sort the objects and route it to different destinations within the facility under computer/software control.

In some cases, the motion system may utilize only the shoes/footwear taught herein (e.g., no moving floor tiles) to achieve useful results. For example, variable friction of two persons standing on the same surface. In one case, the variable friction is used to provide a more equal tug of war between two people of different size by providing less friction for the larger of the two people. In another case, variable friction is used when two people are trying to push against each other (e.g., a Sumo wrestling-type experience where the friction between one or both of the contestants and the floor may be modified/controlled). Likewise, a preferential friction may be provided on a large object (e.g., a boulder) so one or more persons can move the large object while another may not or may only be able to during particular times during a game/competition. The preferential friction shoes can be used to provide variable friction when a person is climbing upon an inclined surface.

The motion imparted upon a VR participant may involve turning the person and not always be a linear path. For example, each shoe may be independently phased and, as a result, turns can be accomplished especially when a person's left (or right) shoe is moved at a different speed than the person's right (or left) shoe. On a particular active tile, different transducers may be used to move the person's feet at different rates.

The motion system may be implemented using a wide variety of friction control methods including the ones discussed above and the following approaches: (a) subsonic, audible, or ultrasonic vibration of a surface by use of piezo electric transducers; (b) transducers under a cover sheet; (c) transducers mounted on studs; (d) transducers that radiate their power through a medium such as water to a top surface that the object is positioned upon; (e) a sheet of water or other liquid that is forced under pressure through small holes in a surface based on actuation of a small "compression" cylinder (e.g., when the water has lifted the object above it, the water slides into return channel to be reused during the lift phase); (f) friction modulated by a magnetic slurry placed on the surface; (g) electromagnets to attract the shoe to the surface of the tile/plate (which could be a ferrous metal); (h) a rapid chemical reaction that either solidifies a coating material or makes it more slippery; (i) rapid state change of materials caused by rapid changes of temperature of a liquid on the surface of a tile/plate; and (j) blowing compressed or pressurized air alternately in a controlled manner through holes in the floor's (or in the tiles') upper surface (or even through holes in the lower surface of the participant's shoes/footwear).

We claim:

1. A motion system for moving objects in a space, comprising:
    a motion system controller;
    a position monitoring assembly; and
    a modular floor comprising a plurality of tile assemblies defining a support surface for a first and a second object,
    wherein each of the tile assemblies comprises a planar tile with an upper surface for supporting the first and second objects and a drive system with a vibration-inducing assembly operable to oscillate the planar tile in a horizontal plane and with a preferential friction assembly operable to selectively reduce friction between the upper surface and any object supported upon the upper surface,
    wherein the motion system controller generates control signals, based on position information for the first and second objects from the position monitoring assembly, to independently control operation of the tile assemblies of the modular floor to move the first and second objects on the support surface with first and second motions, respectively, with the second motion differing from the first motion at least periodically during the control operation,
    wherein the control operation comprises assigning first and second sets of two or more of the planar tiles to each of the first and second objects, respectively, to impart the first and second motions,
    wherein all of the planar tiles in the first set of the planar tiles and all of the planar tiles in the second set of the planar tiles are concurrently operated in a like manner,
    wherein the preferential friction assembly comprises a plurality of ultrasonic transducers positioned on the upper surface of the planar tile,
    wherein the plurality of ultrasonic transducers provides vertical support of the first and second objects and, for each of the planar tiles, are disposed between the upper surface and the first and second objects, and
    wherein the plurality of ultrasonic transducers in each of the tile assemblies oscillate with the planar tile with operations of the vibration-inducing assembly.

2. The motion system of claim 1, wherein the vibration-inducing assembly comprises an electric motor and a rotation-to-X-Y vibratory cam coupled to an output shaft of the electric motor and to the planar tile.

3. The motion system of claim 1, wherein the motion system controller determines a predicted path for the first and second objects and a distance to other objects in the space and, in response, generates the control signals to move the first and second objects to avoid contact with the other objects.

4. The motion system of claim 1, wherein the motion system controller determines a predicted path for the first and second objects and generates the control signals to move the first and second objects in a direction opposite a direction of travel along the predicted path.

5. The motion system of claim 1, wherein the objects comprise footwear of first and second participants of a virtual reality (VR) environment and wherein the control signals are generated to independently move the first and second participants respectively in a first direction and a second direction that differs from the first direction.

6. A motion system for moving objects in a space, comprising:
   a motion system controller;
   a position monitoring assembly; and
   a modular floor comprising a plurality of tile assemblies defining a support surface for a first and a second object,
   wherein each of the tile assemblies comprises a planar tile with an upper surface for supporting the first and second objects and a drive system with a vibration-inducing assembly operable to oscillate the planar tile in a horizontal plane and with a preferential friction assembly operable to selectively reduce friction between the upper surface and any object supported upon the upper surface,
   wherein the motion system controller generates control signals, based on position information for the first and second objects from the position monitoring assembly, to independently control operation of the tile assemblies of the modular floor to move the first and second objects on the support surface with first and second motions, respectively, with the second motion differing from the first motion at least periodically during the control operation,
   wherein the control operation comprises assigning first and second sets of two or more of the planar tiles to each of the first and second objects, respectively, to impart the first and second motions,
   wherein the planar tiles in the first set of the planar tiles and the planar tiles in the second set of the planar tiles are concurrently operated in a like manner,
   wherein the preferential friction assembly comprises an array of a plurality of ultrasonic transducers provided on or in the first and second objects, whereby in each of the first and second objects the plurality of ultrasonic transducers are positioned proximate to the upper surfaces of the tiles when the first and second objects supported on the support surface, and
   wherein the plurality of ultrasonic transducers operate in response to the control signals to vibrate the first and second objects relative to the support surface.

7. The motion system of claim 6, wherein the vibration-inducing assembly comprises an electric motor and a rotation-to-X-Y vibratory cam coupled to an output shaft of the electric motor and to the planar tile.

8. The motion system of claim 6, wherein the motion system controller determines a predicted path for the first and second objects and a distance to other objects in the space and, in response, generates the control signals to move the first and second objects to avoid contact with the other objects.

9. The motion system of claim 6, wherein the motion system controller determines a predicted path for the first and second objects and generates the control signals to move the first and second objects in a direction opposite a direction of travel along the predicted path.

10. The motion system of claim 6, wherein the objects comprise footwear of first and second participants of a virtual reality (VR) environment and wherein the control signals are generated to independently move the first and second participants in a first direction and a second direction that differs from the first direction.

11. A motion system for moving objects in a space, comprising:
   a motion system controller;
   a position monitoring assembly; and
   a modular floor comprising a plurality of tile assemblies defining a support surface for a first and a second object,
   wherein each of the tile assemblies comprises a planar tile with an upper surface for supporting the first and second objects and a drive system with a vibration-inducing assembly operable to oscillate the planar tile in a horizontal plane and with a preferential friction assembly operable to selectively reduce friction between the upper surface and any object supported upon the upper surface concurrently with the operation of the vibration-inducing assembly to oscillate the planar tile in the horizontal plane,
   wherein the motion system controller generates control signals, based on position information for the first and second objects from the position monitoring assembly, to independently control operation of the tile assemblies of the modular floor to move the first and second objects on the support surface with first and second motions, respectively, with the second motion differing from the first motion at least once during the control operation,
   wherein the control operation comprises assigning first and second sets of two or more of the planar tiles to each of the first and second objects, respectively, to impart the first and second motions,
   wherein all of the planar tiles in the first set of the planar tiles and all of the planar tiles in the second set of the planar tiles are concurrently operated in a like manner, and
   wherein the preferential friction assembly comprises an actuator vibrating the planar tile to move the upper surface orthogonal to the horizontal plane of the planar tile in the Z direction.

12. The motion system of claim 11, wherein the vibration-inducing assembly comprises an electric motor and a rotation-to-X-Y vibratory cam coupled to an output shaft of the electric motor and to the planar tile.

13. The motion system of claim 11, wherein the motion system controller determines a predicted path for the first and second objects and a distance to other objects in the space and, in response, generates the control signals to move the first and second objects to avoid contact with the other objects.

14. The motion system of claim 11, wherein the motion system controller determines a predicted path for the first and second objects and generates the control signals to move the first and second objects in a direction opposite a direction of travel along the predicted path.

15. The motion system of claim 11, wherein the objects comprise footwear of first and second participants of a virtual reality (VR) environment and wherein the control signals are generated to independently move the first and second participants in a first direction and a second direction that differs from the first direction.

16. A virtual reality (VR) system, comprising:
a space defined by a wall; and
a VR floor adjoining the wall and comprising a plurality of active tiles, wherein each of the active tiles includes:
a plate with an upper surface and a lower surface;
a drive system coupled to the lower surface and operable to selectively oscillate the plate in one of two transverse directions; and
a preferential friction assembly selectively reducing friction between the upper surface and an object positioned upon the upper surface,
wherein the preferential friction assembly comprises a plurality of ultrasonic transducers positioned on the upper surface of the plate to support the object when it is positioned upon the upper surface and to be disposed between the upper surface and the object, an array of ultrasonic transducers on a surface of the object abutting the upper surface, or an actuator vibrating the plate to move the upper surface in the Z direction concurrently with the operation of the drive system,
further comprising a controller independently operating the active tiles to move first and second VR participants in the space along one or more travel paths,
wherein the controller controls operation of the active tiles, in first and second sets of the active tiles each assigned, respectively, to one of the first and second VR participants during each operating period, to move the first and second VR participants on the support surface with first and second motions, respectively, with the second motion differing from the first motion at least in some of the operating periods, and
wherein all of the active tiles in the first set of the active tiles and all of the active tiles in the second set of the active tiles are concurrently operated in a like manner.

17. The VR system of claim 16, wherein the drive system comprises an electric motor and a rotation-to-X-Y vibratory cam coupled to an output shaft of the electric motor and to the lower surface of the plate.

* * * * *